United States Patent
Miyahara et al.

(10) Patent No.: US 7,350,848 B2
(45) Date of Patent: Apr. 1, 2008

(54) NOISE ISOLATION SHEET

(75) Inventors: Hiroaki Miyahara, Hiroshima (JP); Shinichiro Emori, Hatsukaichi (JP)

(73) Assignee: Nishikawa Rubber Co., Ltd., Hiroshima-shi (JP)

( * ) Notice: Subject to any disclaimer, the term of this patent is extended or adjusted under 35 U.S.C. 154(b) by 141 days.

(21) Appl. No.: 11/249,953

(22) Filed: Oct. 13, 2005

(65) Prior Publication Data

US 2006/0049662 A1   Mar. 9, 2006

Related U.S. Application Data

(63) Continuation-in-part of application No. 10/809,606, filed on Mar. 24, 2004, now abandoned.

(30) Foreign Application Priority Data

Apr. 11, 2003 (JP) .............................. 2003-108129
Jan. 28, 2004 (JP) .............................. 2004-20415

(51) Int. Cl.
   *B60J 5/00* (2006.01)
(52) U.S. Cl. .................................................. 296/146.7
(58) Field of Classification Search ............. 296/146.7, 296/1.03, 1.08, 39.3, 39.1, 181.6; 49/501, 49/502
   See application file for complete search history.

(56) References Cited

U.S. PATENT DOCUMENTS

| | | | |
|---|---|---|---|
| 447,183 A | 2/1891 | Hoen | |
| 2,124,463 A | 7/1938 | Cunnington | |
| 3,616,029 A | 10/1971 | Lerman | |
| 3,778,101 A | 12/1973 | Tsuda | |
| 4,541,885 A | 9/1985 | Caudill, Jr. | |
| 5,040,335 A * | 8/1991 | Grimes ........................ | 49/502 |
| 5,111,619 A | 5/1992 | Billin et al. | |
| 5,224,299 A | 7/1993 | Abe | |
| 5,242,750 A | 9/1993 | Wagner et al. | |
| 5,345,720 A | 9/1994 | Illbruck et al. | |
| 5,595,415 A | 1/1997 | Beaulat | |
| 5,626,382 A * | 5/1997 | Johnson et al. .......... | 296/146.7 |
| 5,695,865 A * | 12/1997 | Shimizu ..................... | 428/212 |
| 5,932,331 A * | 8/1999 | Jones et al. ................. | 428/218 |
| 6,071,580 A | 6/2000 | Bland et al. | |
| 6,183,038 B1 | 2/2001 | Hansen et al. | |
| 6,197,403 B1 | 3/2001 | Brown et al. | |
| 6,207,244 B1 | 3/2001 | Hesch | |

(Continued)

FOREIGN PATENT DOCUMENTS

DE     43 37 468 A1     5/1994

(Continued)

*Primary Examiner*—H Gutman
(74) *Attorney, Agent, or Firm*—Frishauf, Holtz, Goodman & Chick, P.C.

(57) ABSTRACT

A noise isolation sheet is installed in a car door that includes a door inner panel and an interior door trim. The door trim is provided inside the door inner panel. The noise isolation sheet partially or wholly covers the door inner panel. The noise isolation sheet has at least two layers including an outer side sheet and an inner side sheet. The outer side sheet includes a first foam body having water absorption of less than 30%, and the inner side sheet includes a second foam body having water absorption of 30% or more.

6 Claims, 3 Drawing Sheets

U.S. PATENT DOCUMENTS

| | | |
|---|---|---|
| 6,238,507 B1 | 5/2001 | Jones et al. |
| 6,260,660 B1 | 7/2001 | Yoerkie, Jr. et al. |
| 6,302,472 B1 | 10/2001 | Rahmstorf et al. |
| 6,412,852 B1 | 7/2002 | Koa et al. |
| 6,447,047 B1 | 9/2002 | Marcovecchio et al. |
| 6,561,562 B1 | 5/2003 | Hesch |
| 6,590,006 B2 | 7/2003 | Park et al. |
| 6,601,673 B2 | 8/2003 | Murakami et al. |
| 6,619,724 B2 | 9/2003 | Blomeling et al. |
| 6,659,536 B1 | 12/2003 | Chamberlain et al. |
| 6,676,195 B1 | 1/2004 | Marriott et al. |
| 6,708,462 B2 * | 3/2004 | Pokorzynski et al. ...... 52/716.5 |
| 6,814,382 B2 | 11/2004 | Kohara et al. |
| 6,872,758 B2 | 3/2005 | Simpson et al. |
| 2001/0030444 A1 | 10/2001 | Whitehead et al. |
| 2002/0027376 A1* | 3/2002 | Marcovecchio et al. . 296/146.7 |
| 2002/0125734 A1* | 9/2002 | Pokorzynski et al. .... 296/146.7 |
| 2002/0170235 A1 | 11/2002 | Petroski et al. |
| 2003/0001408 A1 | 1/2003 | Hockenberry et al. |
| 2003/0164624 A1 | 9/2003 | Kohara et al. |
| 2004/0039072 A1 | 2/2004 | Park |
| 2004/0167240 A1 | 8/2004 | Burgun et al. |
| 2004/0201246 A1 | 10/2004 | Miyahara et al. |
| 2005/0086823 A1 | 4/2005 | Subramonian et al. |

FOREIGN PATENT DOCUMENTS

| | | |
|---|---|---|
| DE | 196 32 550 A1 | 2/1998 |
| EP | 0 694 426 A2 | 1/1996 |
| GB | 2 163 388 | 2/1986 |
| JP | 5-23376 A | 2/1993 |
| JP | 5-23375 | 6/1993 |
| JP | H5-23376 | 6/1993 |
| JP | 06-040296 A | 2/1994 |
| JP | 10-119159 | 5/1998 |
| JP | 10278586 A | 10/1998 |
| JP | 2001-105521 A | 4/2001 |
| JP | 2004-323002 A | 11/2001 |
| JP | 2003-252054 A | 9/2003 |
| JP | 2004-058982 A | 2/2004 |

* cited by examiner ably, in order to move the door glass 70 in the upward and downward directions. Therefore, the noise

NOISE ISOLATION SHEET

CROSS-REFERENCE TO RELATED APPLICATION

The present application is a continuation-in-part of application Ser. No. 10/809,606, filed Mar. 24, 2004 now abandoned, the entire contents of which are incorporated herein by reference.

BACKGROUND OF THE INVENTION

1. Field of the Invention

The present invention relates to a noise isolation sheet provided to cover a panel, e.g., a door inner panel that is installed inside an automobile door.

2. Description of the Prior Art

As illustrated in FIG. 3, according to a known method of insulating noise in the interior of a door 60, a felt 2 or urethane is attached to the backside of an interior door trim 1 which is provided to the inner side of a door inner panel, or an article made from urethane is attached to the inner side of the door inner panel.

For example, the examined utility model application publication No. H5-23376 discloses a door trim which is provided with a pad material made of urethane foam and the like. The published patent application No. H10-119159 discloses a noise isolation cover made of urethane foam.

However, according to the above-described publications, the noise insulating effect is not satisfactory, because the felt 2, urethane, pad material and isolation cover are all made independently and are installed only partially to the side of the door trim 1 or the inner side of the door inner panel.

Further, the noise insulating members according to these publications are only partially installed, which causes the installation operation to be troublesome.

Concerning the above-mentioned problem, the assignee of the present invention previously provided a structure, as shown in FIGS. 4-6, wherein an isolation sheet 20 is provided between a door inner panel 11 and a door trim 12 and wherein the top end of the sheet 20 is secured to an inner weather strip 15 just like a curtain hanging from the upper part to the lower part of the door interior (See Japanese patent application No. 2002-57777).

In this structure, the inner weather strip 15 is composed of an installation base 16, seal lip portions 17 and 18, which are provided such that seal lip portion 17 is above seal lip portion 18, for elastically making contacts, from the inner side, with a door glass 70 which slides in the upward and downward directions, and a support portion 19 which extends downwardly from the installation base 16 for supporting the seal lip portions 17 and 18. A plurality of lip portions 16a and position adjustment protrusions 16b are provided on the upper surface of the installation base 16. The installation base 16 is inserted into a concave portion 13 formed on the upper portion of the door trim 12, while each of the position adjustment protrusions 16b makes contact with a corresponding step portion 13a on an interior of the concave portion 13 to position the installation base properly. The door trim 12 is fixed to a door inner panel 11 with clips 50.

According to this structure, two spaces X and Y are created between the door inner panel 11 and door trim 12 by the isolation sheet 20, so that the noise insulating effect improves compared to the conventional noise insulation mechanism, in which a felt, urethane, pad material, noise isolation cover and the like are used. Further, the noise isolation sheet 20 is provided by merely hanging the sheet 20 from the upper part to the lower part of the door interior, so that an installation operation is easy.

However, according to the prior art comprising the noise isolation sheet 20, water may invade from the outside of a car. Further, it is desired to produce a noise isolation sheet having better noise insulating and waterproofing functions.

Therefore, it is an object of the present invention to provide a noise isolation sheet which substantially prevents of water from invading from the outside of a car, and to improve a noise insulating property by restraining the outside noise from invading into the interior of a car as well as the interior noise from leaking outside of the car, in comparison with the prior art.

SUMMARY OF THE INVENTION

In order to solve the above-mentioned problems, a noise isolation sheet (100) is provided that partially or wholly covers a panel (11) provided inside a car door (60). The noise isolation sheet (100) has at least two layers comprising an outer side sheet (101) and an inner side sheet (102). The outer side sheet (101) is a sheet made of a foam body having water absorption of less than 30%, and the inner side sheet (102) is a sheet made of a foam body having water absorption of 30% or more.

In addition, according to the present invention a noise isolation sheet (100) is provided for a car door which comprises a door inner panel (11) and an interior door trim (12). The door trim (12) is provided inside the door inner panel (11). The noise isolation sheet (100) partially or wholly covers the door inner panel (11). The noise isolation sheet (100) has at least two layers comprising an outer side sheet (101) and an inner side sheet (102). The outer side sheet (101) is a sheet made of a foam body having water absorption of less than 30%, and the inner side sheet (102) is a sheet made of a foam body having water absorption of 30% or more.

Each reference numeral in parentheses indicates a corresponding element or item shown in the drawings or preferred embodiment of the invention described hereinafter.

According to the invention, the noise isolation sheet, which covers a panel provided inside a door, has at least two layers including: (i) an outer side sheet at the outer side thereof having water absorption of less than 30%, to prevent water from invading from the outside of a car and to improve the noise insulating property as well, and (ii) an inner side sheet at the inner side which is made of a foam body having water absorption of 30% or more, so that the noise absorption property in the material can be improved through a wider range in a frequency band.

Moreover, both the outer side sheet and inner side sheet are made of foam bodies so that the noise isolation sheet can be reduced in weight.

DESCRIPTION OF PREFERRED EMBODIMENT

Figure 1:
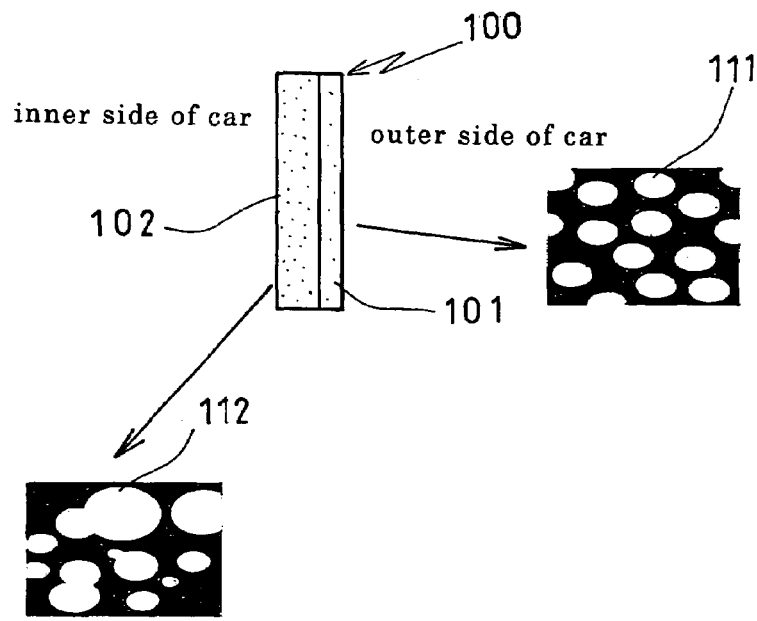
FIG. 1 is a sectional view showing a primary portion of a noise isolation sheet according to the preferred embodiment of the invention.
Figure 4:
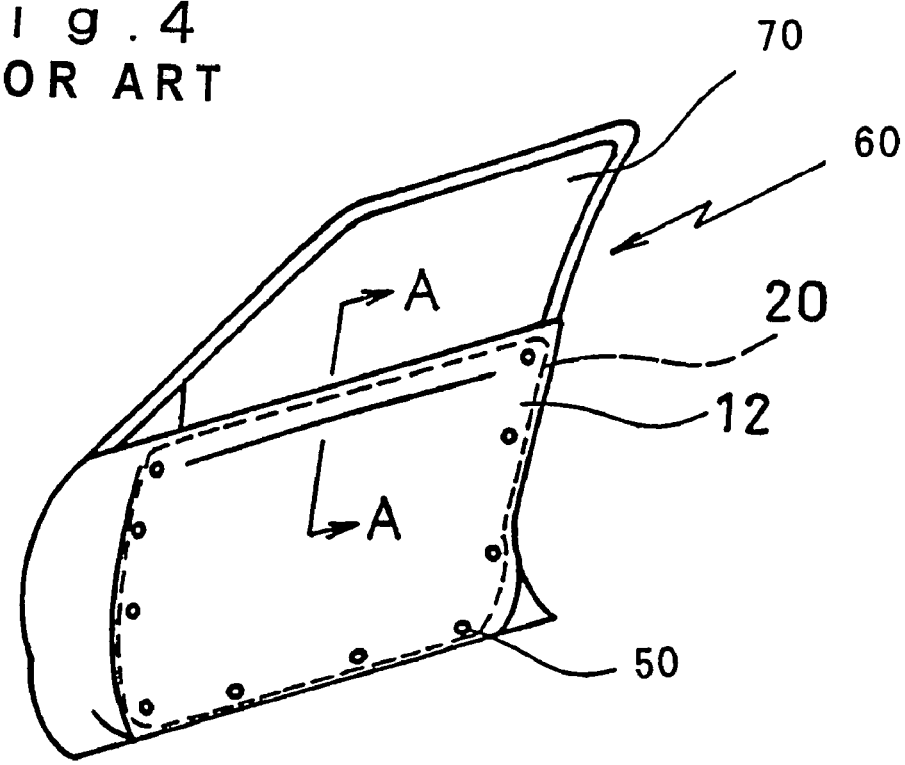
FIG. 4 is a perspective view showing an outlook of a door comprising a noise isolation sheet according to a previous invention owned by the assignee.

A preferred embodiment of the noise isolation sheet 100 according to the invention will be described referring to FIG. 1. FIG. 1 is a sectional view showing a primary portion of the noise isolation sheet 100 according to the preferred embodiment of the invention. It should be noted that the noise isolation sheet 100 in this embodiment is installed in place of the noise isolation sheet 20 illustrated in FIGS. 4 to 6.

The noise isolation sheet 100 according to the preferred embodiment of the invention is provided between a door inner panel 11 installed inside a car door 60 and an interior door trim 12 installed inside the door inner panel 11, hanging just like a curtain from the upper part to the lower part of the interior of the door 60, thereby covering the entire portion of the door inner panel 11. (The noise isolation sheet 100 may be arranged to partially cover the inner panel 11 instead.)

The noise isolation sheet 100 may be fixed with a sealer, clips and the like at the end portion thereof.

Figure 5:
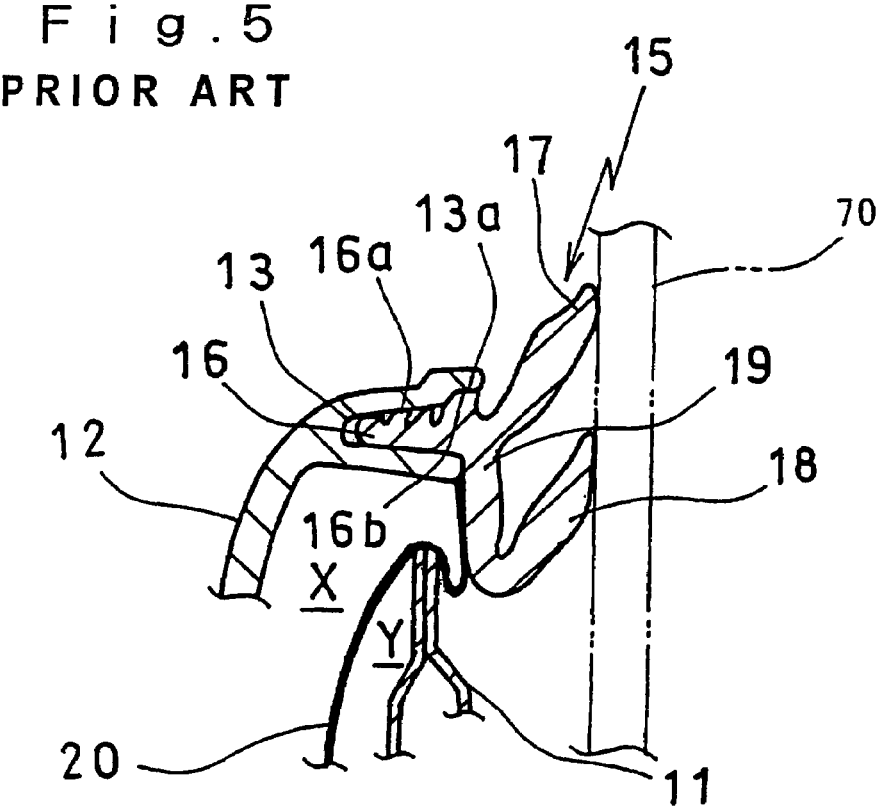
FIG. 5 is an enlarged section view along line A-A in FIG. 4.
Figure 6:
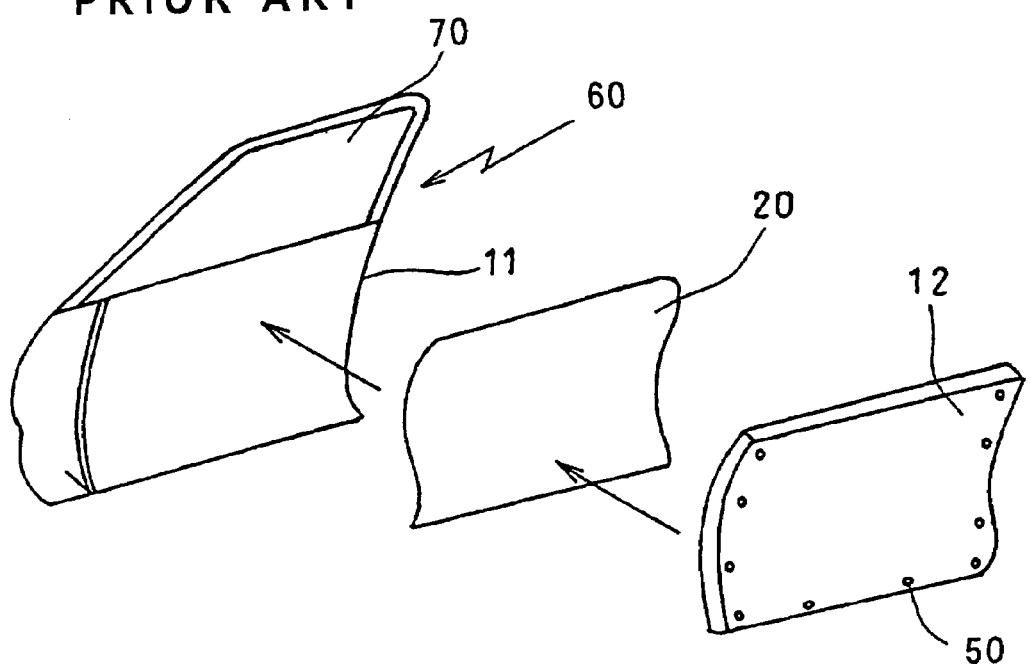
FIG. 6 is a perspective view showing a disassembled door to which the noise isolation sheet of the previous invention of the assignee.

The noise isolation sheet 100 is secured to the door inner panel 11 or door trim 12 at the top edge thereof. The door trim 12 is fixed to the door inner panel 11 with clips 50. As illustrated in FIG. 5 with respect to the noise isolation sheet 20, the noise isolation sheet 100 may be secured to the inner weather strip 15, which is secured to the door trim 12, at the upper end thereof (In this case, the inner weather strip 15 may be secured to the door inner panel 11 instead of the door trim 12.) Slits may be provided in the noise isolation sheet 100 for mounting, to the door panel, a door handle as well as a harness and lock relating to a power window system in an installation operation to easily remove therethrough.

As illustrated in FIG. 1, the noise isolation sheet 100 has two layers comprising an outer side sheet 101 provided at the outer side thereof and an inner side sheet 102 provided at the inner side thereof The outer side sheet 101 is a sheet made of a foam body having water absorption of less than 30%, while the inner side sheet 102 is a sheet made of a foam body having water absorption of 30% or more. Preferably, the foam body of the inner side sheet 102 should have a water absorption of from 30 to 60%, and the foam body of the outer side sheet 101 should have a water absorption of less than 30%. According to the present invention, water absorption is determined using the ASTM standard D 1056-00.

The outer side sheet 101 includes, for example, a foam body, which includes a plurality of closed cells 111 which are provided inside the foam body, and which has a water absorption of less than 30%. The water absorption of the foam body of the outer side sheet 101 may be, for example, 20%.

The inner side sheet 102 includes, for example, a foam body, which includes a plurality of closed cells as well as a plurality of continuous (open) cells 112 which are formed when adjacent cells communicate with each other. The foam body of the inner side sheet 102 has a water absorption of 30% or more (preferably 30-60%). The water absorption of the foam body of the inner side sheet 102 may be, for example, 40%.

The noise isolation sheet 100 is roughly rectangular and it is made, though it is not critical, of materials such as EPDM, CR, SBR, NBR and the like. Among those materials, EPDM is preferable since it is highly foamed easily and is easily controlled in fixing a density thereof to be a desired density. When EPDM is used, for example, it is preferred that the density thereof is fixed to 0.10 to 0.15.

The noise isolation sheet 100 may be made of a laminated sheet comprising at least two layers, which includes a sheet made of a foam body having water absorption of less than 30% and a sheet made of a foam body having water absorption of 30% or more (preferably 30-60%), wherein both sheets are bound together with an adhesive agent, clips or the like. Further, the noise isolation sheet 100 may be formed by a process of placing two particular sheets in a mold, wherein water absorption of either one is to become less than 30% and that of the other is to become 30% or more (preferably 30-60%) after a vulcanization process, followed by a process of heating the sheets to unify them. Moreover, there is another method of forming the noise isolation sheet 100 wherein a sheet having at least two layers is formed by co-extrusion and is heated to form a laminated sheet having a plurality of layers.

With the noise isolation sheet 100 formed in any one of the methods described above, two spaces are formed between a door inner panel 11 and a door trim 12 by the sheet 100, so that the noise insulating property improves.

It will particularly be noted that the noise isolation sheet 100 is a double layer sheet including a sheet 101 having water absorption of less than 30%, so that water is prevented from invading from the outside and the noise insulating property can be improved.

Further, the noise isolation sheet 100 comprises a sheet 102 at the inner side of a car having water absorption of 30% or more (preferably 30-60%), so that the noise absorbing property in the material can be improved through wider range of a frequency band.

Figure 2:
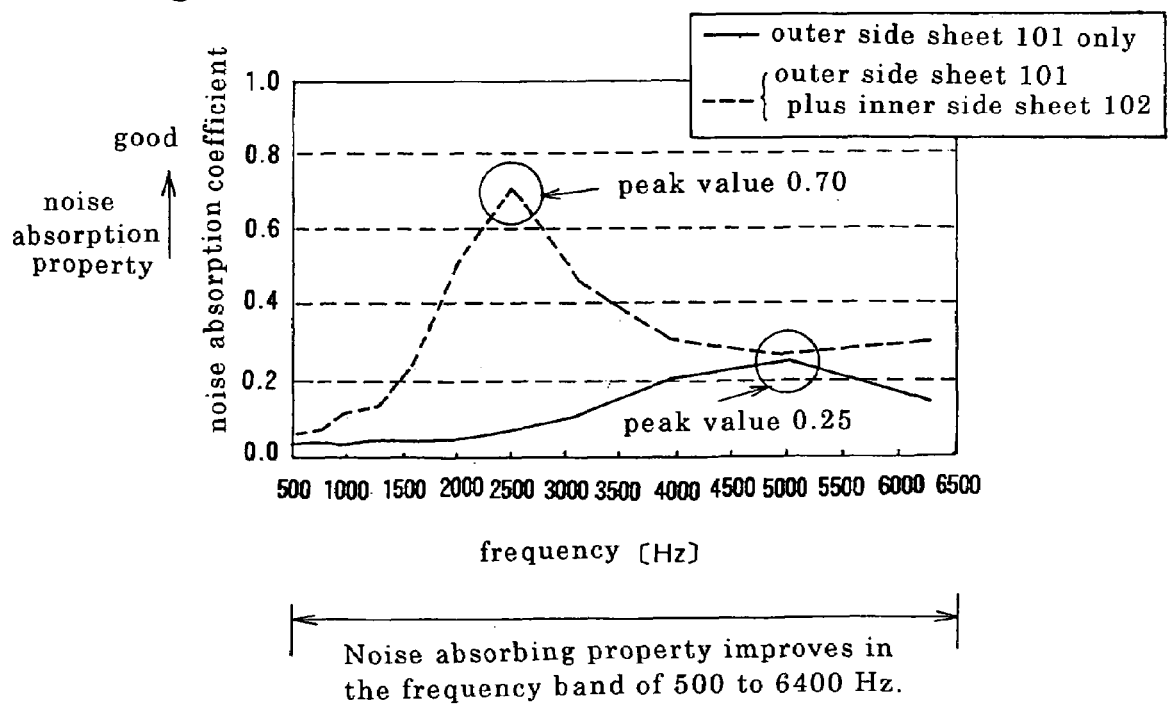
FIG. 2 is a graph showing frequency characteristics of a noise isolation sheet according to the preferred embodiment of the invention and a noise isolation sheet compared with the sheet of the invention.
Figure 3:
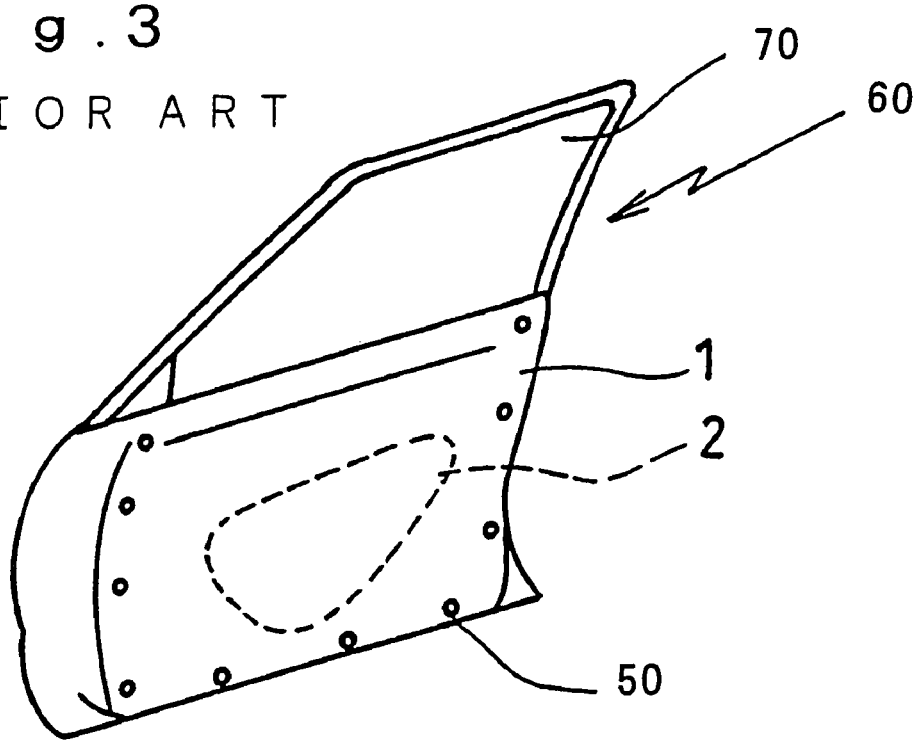
FIG. 3 is a perspective view showing an outlook of a door comprising a felt according to the prior art.

It will be well understood from the experimental result as illustrated in FIG. 2 that the noise isolation sheet (the sheet 100 described in the preferred embodiment of the invention) composed of an outer side sheet 101 having water absorption of less than 30% and an inner side sheet 102 having water absorption of 30% or more is higher in the noise absorption coefficient in the high frequency band of 500 Hz to 6400 Hz compared to the sheet composed merely of an outer side sheet 101 having water absorption of less than 30%. Particularly, the noise absorption coefficient of the sheet 100 exhibits the peak value of 0.7 around the frequency of 2500 Hz.

It will be noted that the noise isolation sheet 100 according to the preferred embodiment of the invention is composed of two layers including the outer side sheet 101 and the inner side sheet 102. However, the sheet 100 may be formed of more than two layers to further improve the water proofing and noise insulating effects.

We claim:

1. A noise isolation sheet for at least partially covering a panel provided inside a car door, wherein said noise isolation sheet comprises:
    an outer side sheet comprising a first foam body; and
    an inner side sheet comprising a second foam body;
    wherein a water absorption of the first foam body is less than 30%, and a water absorption of the second foam body is at least 30%; and wherein the water absorption of the first foam body and the water absorption of the second foam body are determined using ASTM standard D 1056-00.

2. The noise isolation sheet according to claim 1, wherein the water absorption of the second foam body is not more than 60%.

3. A noise isolation sheet for a car door comprising a door inner panel and an interior door trim provided inside said door inner panel, wherein said noise isolation sheet is adapted to cover said door inner panel at least partially, said noise isolation sheet comprising:
   an outer side sheet comprising a first foam body; and
   an inner side sheet comprising a second foam body;
   wherein a water absorption of the first foam body is less than 30%, and a water absorption of the second foam body is at least 30%; and
   wherein the water absorption of the first foam body and the water absorption of the second foam body are determined using ASTM standard D 1056-00.

4. The noise isolation sheet according to claim 3, wherein the water absorption of the second foam body is not more than 60%.

5. A two-layer noise isolation sheet for at least partially covering a panel provided inside a car door, wherein said two-layer noise isolation sheet comprises:
   an outer side sheet comprising a first foam body; and
   an inner side sheet comprising a second foam body;
   wherein a water absorption of the first foam body is less than 30%, and a water absorption of the second foam body is at least 30%; and
   wherein the water absorption of the first foam body and the water absorption of the second foam body are determined using ASTM standard D 1056-00.

6. The noise isolation sheet according to claim 5, wherein the water absorption of the second foam body is not more than 60%.

* * * * *